United States Patent [19]

Hofmann

[11] Patent Number: 4,504,914

[45] Date of Patent: Mar. 12, 1985

[54] PHOTOGRAMMETRIC DEVICE FOR AIRCRAFT AND SPACECRAFT FOR PRODUCING A DIGITAL TERRAIN REPRESENTATION

[75] Inventor: Otto Hofmann, Kirchstockach, Fed. Rep. of Germany

[73] Assignee: Messerschmitt-Bölköw-Blohm Gesellschaft mit beschrankter Haftung, Munich, Fed. Rep. of Germany

[21] Appl. No.: 321,207

[22] Filed: Nov. 13, 1981

[30] Foreign Application Priority Data

Nov. 19, 1980 [DE] Fed. Rep. of Germany ....... 3043577

[51] Int. Cl.$^3$ ................................................ G01C 11/2
[52] U.S. Cl. .................................... 364/456; 364/571;
250/578; 356/2; 356/376
[58] Field of Search ............... 353/5, 11, 12; 350/500;
364/445, 456, 457, 518, 571, 414; 356/2, 376;
354/65; 250/553, 550, 578; 343/5 MM, 7 TA;
358/103, 106; 244/3.17

[56] References Cited

U.S. PATENT DOCUMENTS

| | | | |
|---|---|---|---|
| 2,866,373 | 12/1958 | Doyle et al. | 364/456 |
| 3,111,556 | 11/1963 | Knoll et al. | 354/65 |
| 3,974,328 | 8/1976 | Thomas et al. | 358/103 |
| 4,179,693 | 12/1979 | Evans et al. | 364/443 |
| 4,313,678 | 2/1982 | Colvocoresses | 356/2 |
| 4,347,511 | 8/1982 | Hofmann et al. | 343/5 MM |

*Primary Examiner*—Gary Chin
*Assistant Examiner*—Edward R. Cosimano
*Attorney, Agent, or Firm*—Toren, McGeady and Stanger

[57] ABSTRACT

A sensor device of the type to be carried on aircraft or spacecraft which travel along an arbitrary flight path, operates to provide data corresponding to the course and orientation of the craft, and a digital display of the terrain over which the craft is traveling. The device includes at least first, second and third sensor lines comprising rows of photosensitive semiconductor elements, arranged transversely of the flight path in an image plane. Each of the sensor lines provides line images corresponding to a terrain image projected onto the sensor line. At least one of the sensor lines extends in the image plane to form angles relative to the other sensor lines, so that the terrain line images produced by the angled sensor line intersect the terrain line images produced by the other sensor lines. This arrangement results in establishing clearly defined connecting points of the images, and provides high accuracy in the determination of the orientation data and of the terrain.

4 Claims, 7 Drawing Figures

PHOTOGRAMMETRIC DEVICE FOR AIRCRAFT AND SPACECRAFT FOR PRODUCING A DIGITAL TERRAIN REPRESENTATION

BACKGROUND OF THE INVENTION

The present invention relates to a photogrammetric device for use in aircraft or spacecraft. The device produces orientation data, the course or flight path of the aircraft or spacecraft, and a digital terrain representation by the use of photosensitive semiconductors arranged in lines or rows. The device is generally of the type described in my copending application Ser. No. 194,430 (the '430 application) filed Oct. 6, 1980, the relevant portions of which are incorporated by reference.

The above '430 application relates to a sensor device which includes an arrangement of at least three spaced-apart sensor lines or rows A, B, C which are parallel to one another. Each of the sensor lines is periodically scanned to provide successive line images or an "image strip". The sensor lines thus produce simultaneously three image strips corresponding to the terrain over which the device is flown. However, each of the image strips is produced from a different perspective. A large number of identical terrain points are determined in the three image strips by means of digital image correlation, and the identical points form rays with the corresponding centers of perspective of the image strips. The intersection of all the rays associated with the three image strips, with a few ground control points, allows a three-dimensional terrain model to be determined, as well as the orientation parameters of the individual line images.

The above determinations can be made either line by line, by tying in each line image as it is produced to the then existing terrain model, or by the simultaneous determination of all orientation parameters of one image strip section, by means of known methods in analytical photogrammetry and balancing calculations.

SUMMARY OF THE INVENTION

An object of the invention is to improve the above-known photogrammetric device, which is basically very useful, so as to achieve even greater stability and accuracy of the determined terrain model and line image orientation parameters.

According to the present invention, at least one of three sensor lines is arranged angularly with respect to the other sensor lines in the image plane, rather than to extend parallel to the other sensor lines. Accordingly, the line images of the terrain produced by the angled sensor line intersect with line images of the same terrain produced by the other ones of the sensor lines.

A particularly advantageous feature of the present device is that external auxiliary devices, and the provision of data corresponding to an already known digital terrain model, are not required. Therefore, the device may operate continuously on its own.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1A:
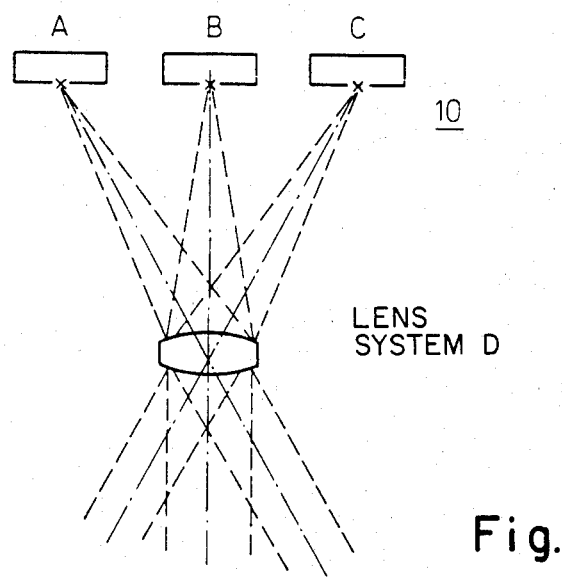
FIG. 1a is a schematic representation of a sensor device including three lines or rows of sensor elements and an optical system.
Figure 1B:
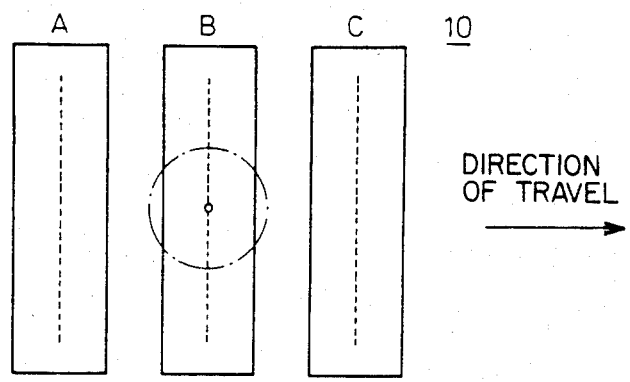
FIG. 1b is a representation of the sensor device shown in FIG. 1a as viewed from above.

Assuming with reference to FIGS. 1a and 1b, that a craft is flown over an absolutely flat terrain through an ideally linear flight path, that a camera device 10 including the lens system D of the craft is aligned normally, i.e., the optical axis of the camera is vertical to the plane of the terrain and sensor lines A,B,C arranged within the camera are each at right angles to the flight path, and that the same flight altitude always is maintained, then all the sensor lines A,B,C when projected into the terrain would lie parallel to one another, and not intersect.

Figure 1C:
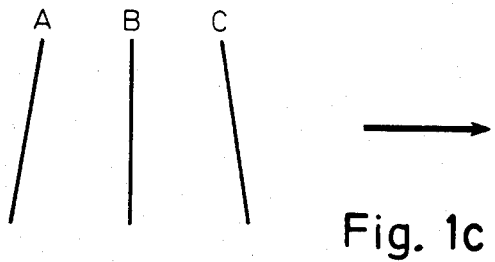
FIG. 1c is a representation of sensor lines arranged angularly relative to one another in a photogrammetric device according to the invention.
Figure 3:
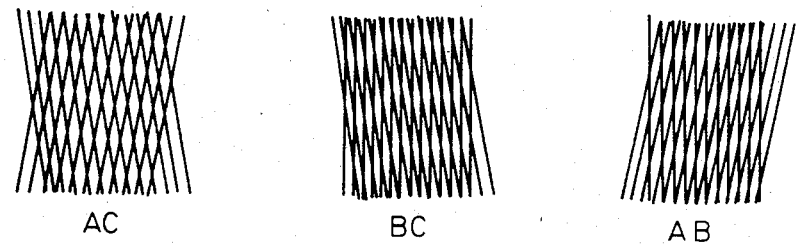
FIG. 3 is a representation of the positions of successive line images of the terrain as produced by the sensor lines of FIG. 1c.

In the above ideal case, which does not occur in reality, there is no direct connection or common connecting point between the three line images produced by the sensor lines. However, if one arranges the three sensor lines A,B,C to form angles with respect to one another, as shown in FIG. 1c, then three image strips are provided which are composed of successive line images which intersect as shown in FIG. 3. This mutual intersection of the line images results in establishing clearly defined connecting points of the images so as to stabilize one another, this stability increasing with an increasing rate of intersection. However, the intersection angle should not be made too large for reasons which are of no interest here.

As is evident, for example, in FIG. 3, several line images from strip A intersect with several line images from strip C. The resulting intersection conditions of the image rays stabilize and determine the mutual position of the parallel line images of the A image strip and the C image strip. The same also applies for the image strip combinations A/B and B/C. All the resulting ray intersecting conditions thus can be determined with great redundancy to find the orientation parameters, which are the same for all three image strips.

The determination of the orientation parameters takes place in a known way, by solution of an equation system containing all orientation parameters of the line images of a specific strip section as an unknown quantity. The present arrangement is important, particularly in the solution of the initial problem, i.e., to obtain the initial orientation over at least one base length at the beginning of the terrain strip, as described in the '430 application.

Figures 2, 4:
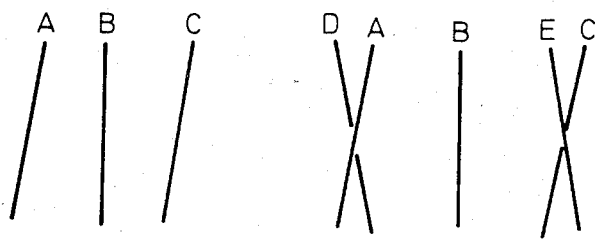
FIG. 2 is a representation of a variation in the arrangement of the sensor lines in the present device.
FIG. 4 is a representation of a second variation in the arrangement of the sensor lines in the present device.
Figure 5:
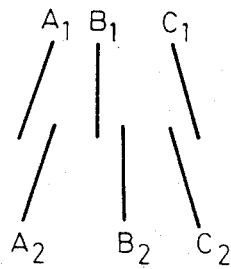
FIG. 5 is a representation of a third variation in the arrangement of the sensor lines in the present device.

The arrangement of the three sensor lines A, B, C as shown in FIG. 1c is not the only possible arrangement. Other line configurations also may be used, particularly one in which each of the lines is comprised of two or more sensor sections (FIG. 5). As shown in FIG. 2, it is only necessary that at least one sensor line (B) form an intersecting angle with respect to the others, so that the line images produced by the angled sensor line intersect in a plan view of the line images produced by the other sensor lines (A and C).

The arrangement shown in FIG. 1c still can be improved to meet stricter requirements, by compensating for the fact that the convergence angles between the image rays produced by the sensor lines A, B and C and the center of perspective in elevation tend to vary and differ from one another. This changes the base-altitude ratio and the convergence angles along the sensor lines and, consequently, the accuracy of the terrain relief determination. The arrangement of FIG. 4 compensates for this by the addition of sensor lines D and E which intersect the outermost sensor lines A and C at certain angles in the image plane. However, while each additional sensor line increases the accuracy of the system, it also increases the operating requirements of computational devices associated with the present device. Therefore, practical considerations will limit the number of additional sensor lines which may be provided.

An arrangement of the sensor lines as shown in FIG. 5 also may be very advantageous, and can be employed in those cases where an entire sensor line is comprised of several sensor chips which are associated with several lenses or beam splitters. For example, see my West German patent application No. 27 29 291.7. In FIG. 5, each sensor line is comprised of offset individual line sections $A_1$, $A_2$, $B_1$, $B_2$, $C_1$, $C_2$ which are realized by the above-mentioned sensor chips. In the present arrangement, however, the line sections $A_1$, $A_2$, $B_1$, $B_2$, $C_1$, $C_2$ can be located in the image plane of a single lens. For practical reasons, and particularly to obtain an image strip which is distorted as little as possible by differences in elevation of the terrain, the centermost sensor line B, or its partial sections $B_1$, $B_2$ ... $B_n$, should be arranged at right angles to the direction of the flight path and into the optical axis, or extend as close as possible into the optical axis.

While specific embodiments of the invention have been shown and described in detail to illustrate the application of the inventive principles, it will be understood that the invention may be embodied otherwise without departing from such principles.

What is claimed is:

1. A sensor device to be carried on aircraft or spacecraft, which craft travel along an arbitrary flight path, for providing data corresponding to the course and orientation of the craft, and a digital display of the terrain over which the craft travels, including a group of at least first, second and third sensor lines each comprising a row of photosensitive semiconductor elements all of which are arranged transversely of the flight path in an image plane for providing terrain line images corresponding to a terrain image directed along an optical axis onto said sensor lines, the improvement comprising that at least one of said sensor lines extends in said image plane to form an oblique angle relative to other ones of said sensor lines so that the terrain line images produced by said at least one sensor line intersect the terrain line images produced by said other ones of said sensor lines.

2. A device according to claim 1, wherein each of said sensor lines comprises a number of line sections which are offset from one another.

3. A device according to claim 1, wherein said device includes a number of compensating sensor lines arranged to compensate for variations of the convergence angles of the image rays with respect to said group of sensor lines, said compensating sensor lines being arranged to intersect the two outermost ones of said group of sensor lines at certain angles in the image plane.

4. A device according to one of claims 1, 2 and 3, wherein the centermost one of said group of sensor lines is arranged to form a right angle relative to the direction of the flight path, and to extend substantially into the optical axis.

* * * * *